(12) United States Patent
Koide et al.

(10) Patent No.: US 6,641,388 B2
(45) Date of Patent: Nov. 4, 2003

(54) ELECTRIC INJECTION MECHANISM

(75) Inventors: Atsushi Koide, Nagano-ken (JP); Kinji Yokoya, Nagano-ken (JP)

(73) Assignee: Nissei Plastic Industrial Co., Ltd., Nagano-Ken (JP)

( * ) Notice: Subject to any disclaimer, the term of this patent is extended or adjusted under 35 U.S.C. 154(b) by 25 days.

(21) Appl. No.: 09/996,651

(22) Filed: Nov. 28, 2001

(65) Prior Publication Data

US 2002/0071889 A1 Jun. 13, 2002

(30) Foreign Application Priority Data

Nov. 29, 2000 (JP) ........................................ 2000-363323

(51) Int. Cl.$^7$ .............................................. B29C 45/18
(52) U.S. Cl. ........................................................ 425/574
(58) Field of Search ................................... 425/574, 150

(56) References Cited

U.S. PATENT DOCUMENTS 5,052,908 A * 10/1991 Inaba et al. ................. 425/150
6,461,139 B1 * 10/2002 Yokoya et al. .............. 425/150

* cited by examiner

Primary Examiner—Tim Heitbrink
(74) Attorney, Agent, or Firm—Weingarten, Schurgin, Gagnebin & Lebovici LLP

(57) ABSTRACT

The present invention reduces an excessive gnawing force at the thread engagement region of a ball screw portion with the ball nut member that tends to be generated in the electric injection mechanism and prevents an abnormal wear or break of the ball screw shaft by installing a stress relaxation means of annular groove at the shaft portion of the ball screw shaft. A ball nut member is engaged by threads with a pair of right and left ball screw shafts rotatably provided in parallel with guide bars over front and rear plates. The shaft portion between the front plate of the ball screw shaft and the ball screw portion is partially formed with a diameter smaller that the root diameter of the ball screw shaft, and a stress relaxation groove with a concave curved surface having a flat bottom is disposed in the shaft portion.

3 Claims, 3 Drawing Sheets

ELECTRIC INJECTION MECHANISM

BACKGROUD OF THE INVENTION

1. Field of the Invention

The present invention concerns an electric injection mechanism for assuring driving of the screw forward by an electric motor.

2. Detailed Description of the Prior Art

The electric injection mechanism, having an electric motor such as a servomotor or the like as a driving source, for forward driving of a screw by converting rotation movement by the electric motor into linear movement by a ball screw shaft and a ball nut member, includes one adopting a single ball screw shaft and one adopting a plurality of ball screw shafts.

In any of these types, a driver for driving a screw forward is provided between a pair of front and rear support plates on a machine base, by inserting the driver onto a guide bar, putting the driver slidably on an installation member, or the like. As the ball screw shaft rotated by the electric motor engages with the ball nut member installed inside the screw driver, the axial lines of the ball screw shaft and the ball nut member are misaligned relatively due to the attachment error of the ball screw shaft or lack of rigidity of the mechanism, easily causing a radial force or moment.

In an electric injection mechanism adopting a single ball screw shaft, the ball screw shaft fixation point is only disposed at the rear end born by the rear plate, and there is a flexibility at the meshing region with the ball nut member; therefore, it is thought that a radial force due to a relative misalignment of axial lines, or a gnawing force by the generation of a moment is hardly caused.

However, in reality, the gnawing force is caused by the relative misalignment of the axis lines of the ball screw shaft and the ball nut member due to the fact that the screw driver is supported by inserting it onto the guide bar and that the rotatable ball screw shaft of the rear support p plate engages by threads with the ball nut member installed inside at the rear middle of the screw driver by rotating the ball screw-shaft through the motor, and the screw driver is driven forward together with the screw.

Further, in an electric injection mechanism adopting a plurality of single ball screw shafts and ball nut members, as a pair of ball screw shafts are disposed rotatably in parallel with the guide bar, and as the ball nut members disposed through the right and left of the screw driver engage by threads with the ball screw shafts, the front and rear ends of the ball screw shafts are in a state fixed to the front and rear plates. As the screw driver is in a state supported through insertion of both the guide bars and ball screw shafts, the flexibility to the radial force or moment is inferior to the case of the single ball screw shaft. If the parallelism between the guide bars and the ball screw shafts deteriorates even slightly, an excessive gnawing force is caused in the engaged region, and a premature wear, peeling off or other phenomena is easily caused in the ball screw.

Additionally, a bending generates in the ball screw shaft and the ball screw shaft comes to be supported slantingly by a bearing. A problem of premature deterioration of the bearing member thereby occurs.

Still further, in an electric injection mechanism linking front and rear guide plates by guide bars, a deflection may be generated in the front plate and the guide bar and may deform the mechanism on the advance and backward movement during the operation, whereby the ball screw shaft bends in a quadratic curb shape between the front and rear fulcrum points. The load distribution on a ball and a ball screw groove in the ball nut member becomes uneven. An inclination generated causes an excessive gnawing force in the ball screw shaft and bearing portion and in the engagement region with the ball nut member, and the ball screw shaft may wear or deteriorate abnormally, and further even break by the stress concentration at this moment.

SUMMARY OF THE INVENTION

The present invention, devised to resolve the aforementioned problems in the ball screw shaft of the driving means adopted by the electric injection mechanism, has an object to provide a novel electric injection mechanism allowing the reduction of the generation of an excessive gnawing force, by installing a stress relaxation means by an annular groove in the ball screw shaft.

According to the above object, one embodiment of the present invention comprises a screw driver disposed movably between a pair of front and rear support plates on the machine base, a driving means comprising a ball screw shaft and a ball nut member disposed over the screw driver and the support plate, and an electric motor of the driving means. A shaft between a ball screw portion and a bearing portion of the ball screw shaft is partially formed with a diameter smaller than a root diameter of a ball screw groove, and a stress relaxation groove having a bottom face with a flat concave curbed face is formed in the shaft.

In addition, another embodiment of the present invention comprises a pair of front and rear support plates disposed on the machine base by linking by means of a plurality of guide bars, a pair of right and left ball screw shafts disposed rotatably in parallel with the guide bars over the support plates, a screw driver provided inside on the right and left with a pair of ball nut members meshing with the ball screw shaft and inserted movably into the guide bar between the support plates, and an electric motor of a driving means comprising the ball screw shaft and ball nut member. A shaft between a ball screw portion and a bearing portion of the ball screw shaft is partially formed with a diameter smaller than the root diameter of a ball screw groove, and a stress relaxation groove having a bottom face with a flat concave curbed face is formed in the shaft.

Further, another embodiment of the present invention comprises a pair of support plates disposed in front and behind an installation member on a machine base, a pair of right and left ball screw shafts juxtaposed rotatably over the support plates, a screw driver provided inside on the right and left with a pair of ball nut members meshing with the ball screw shaft, and put slidably on the installation member between the support plates, and an electric motor of a driving means comprising the ball screw shaft and ball nut member. A shaft between a ball screw portion and a bearing portion of the ball screw shaft is partially formed with a diameter smaller than a root diameter of a ball screw groove, and a stress relaxation groove having a bottom face with a flat concave curbed face is formed in the shaft.

In the aforementioned configurations, the annular stress relaxation groove installed around the shaft portion of the ball screw shaft reduces an excessive gnawing force due to the generation of a radial force or moment, or an excessive gnawing force that tends to be generated due to the deflection during the moment of advance or regression operation of the injection mechanism, and resolves an excessive load at the engagement region of a ball screw portion with the ball nut member. The stress relaxation groove thereby prevents an abnormal wear or deterioration and further breakage of the ball screw shaft, maintains a smooth advance and regression operation of the screw driver, and extends the service life of the ball screw portion and the ball nut member.

DETAILED DESCRIPTION OF THE PREFERRED EMBODIMENT

Figure 1:
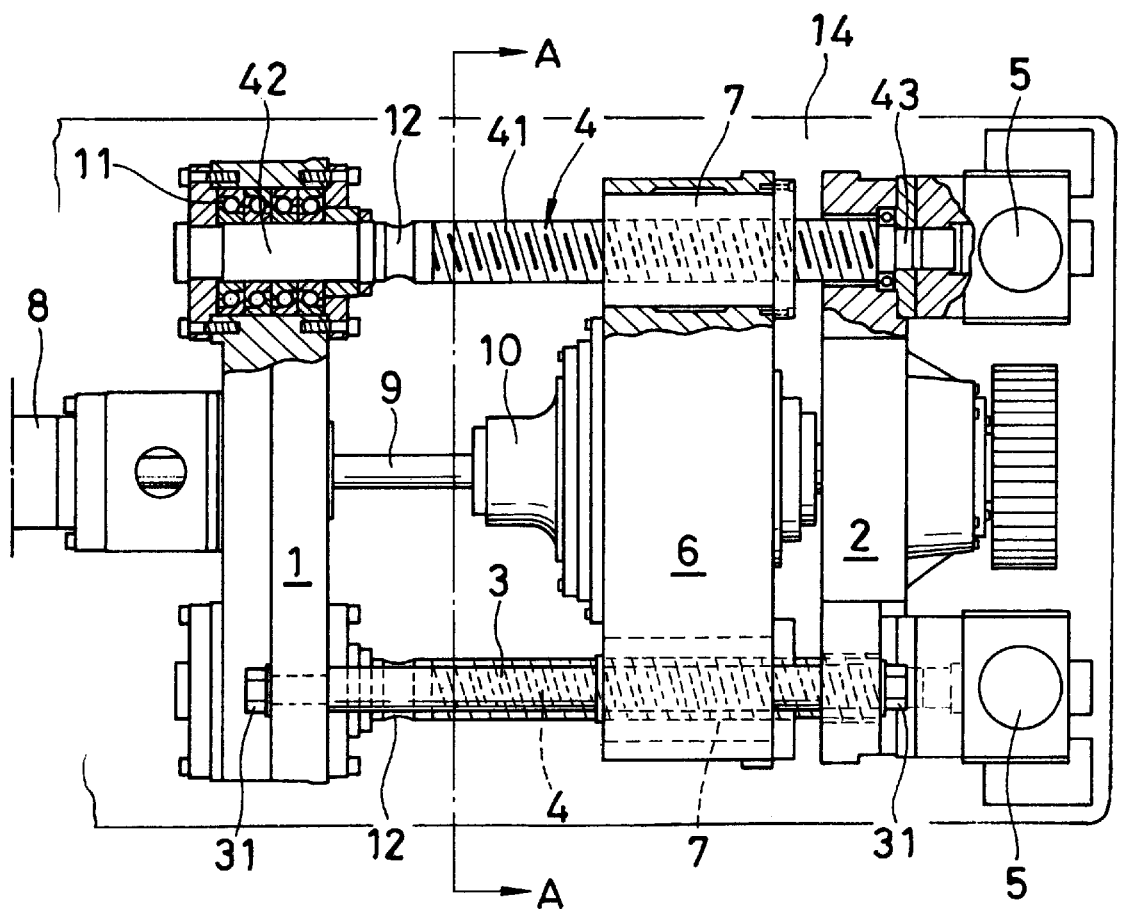
FIG. 1 is a plan view showing a part of the electric injection mechanism of the present invention by the portion.
Figure 2:
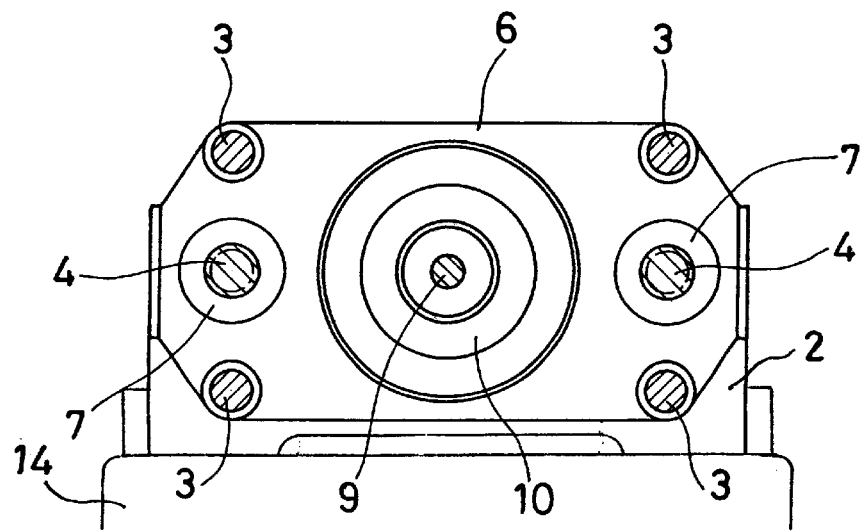
FIG. 2 is a portion view along the line A—A of the same.

The embodiment shown in FIG. 1 and FIG. 2 is an electric injection mechanism having a screw driver supported by inserting both a ball screw shaft and a guide bar. In the drawings, 1 and 2 indicate a pair of front and rear support plates mounted oppositely on a machine base 14 and linked at four corners by the guide bars 3.

4, 4 indicate a pair of right and left ball screw shafts, born rotatably in parallel with the guide bars 3 at the middle sides of both the front and rear plates 1, 2.

5, 5 are electric motors such as servomotors linked to the rear end of the respective ball screw shafts 4, 4, and attached to the outside side face of the rear plate 2.

6 is a screw driver, having a pair of ball nut members 7, 7 installed inside at the middle of the right and left sides. These ball nut members 7, 7 are engaged by threads with the ball screw shafts 4, 4. Four corners of the screw driver 6 are inserted movably forward and backward onto the guide bars 3, and the screw driver is installed movably between the front and rear plates with the ball nut members 7 movable by rotation of the ball screw shafts 4.

Moreover, the rear portion 9 of a screw in an injection heating cylinder 8 attached to the middle front of the front plate 1 is linked to the middle portion of the screw driver 6. The screw rear portion 9, not shown in the drawing, is installed rotatably in the interior of the screw driver 6, and linked to the tip of a coupling 10 fitted to a ball spline shaft rotationally supported at the middle portion of the rear plate 2. Material may be weighed, or metered, by rotation of the screw, via the ball spline shaft through this coupling 10.

The ball screw shaft 4 comprises a ball screw portion 41 engaged by threads with the ball nut member 7 of the screw driver 6. A required length of a shaft portion 42 is born by a bearing member 11 via a ball bearing of the front plate 1, and a support shaft portion 43 of the rear end is born rotatably by the rear plate 2. An annular stress relaxation groove 12 is disposed in a region between a bearing portion at the front plate 1 of the shaft portion 42 and the ball screw portion 41.

Figure 3:
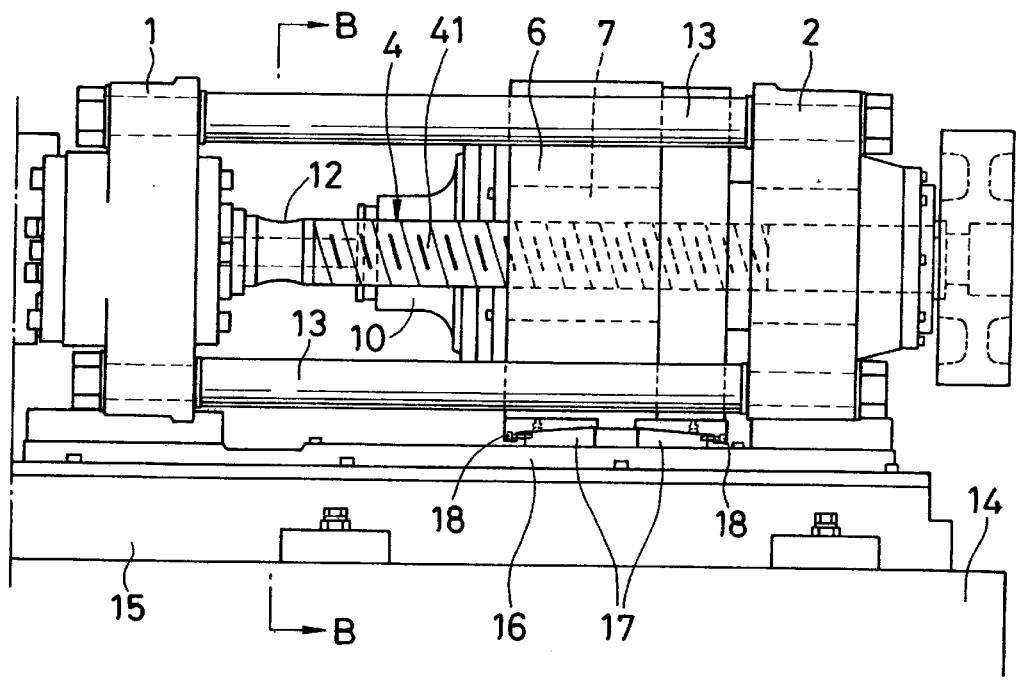
FIG. 3 is a side view of the electric injection mechanism of another embodiment of the present invention.
Figure 4:
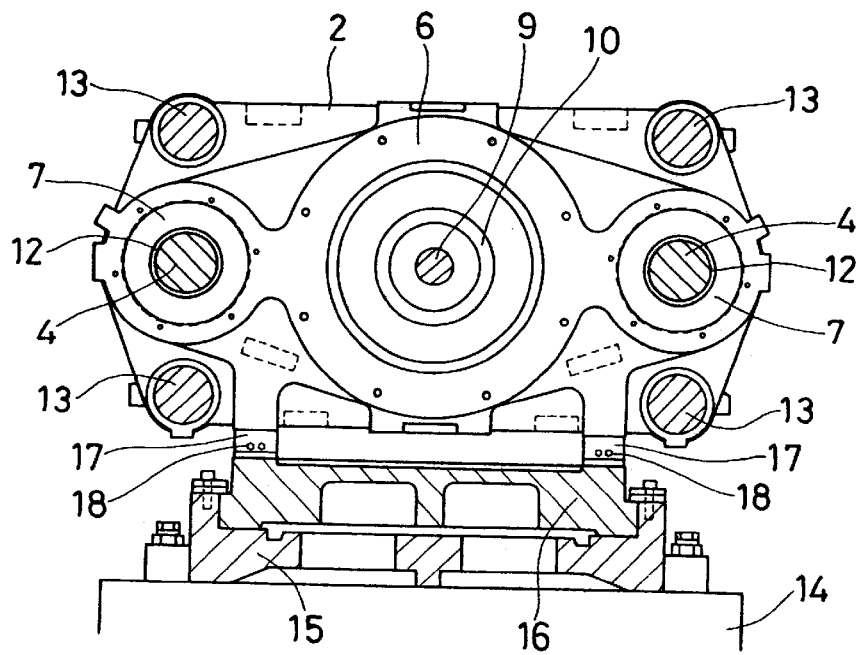
FIG. 4 is a portion view along the line B—B of the same.

FIG. 3 and FIG. 4 indicate an electric injection mechanism wherein the screw driver 6 is slidably put on an installation board on the machine base 14.

It should be appreciated that the same parts as the embodiment shown in FIG. 1 and FIG. 2 are indicated by the same symbols.

In this embodiment, a pair of front and rear plates 1, 2 linked by tie bars 13 are installed on the machine base by putting and fixing both of the lower sides on the installation board 16 that is put on the top face of the foundation 15 of the machine base 14.

A pair of ball screw shafts 4, 4 are installed by rotative bearings in parallel with the tie bars 13, 13, at the middle of both side portions of these front and rear plates 1, 2. An electric motor (not shown) for injection driving is connected to the rear end of the ball screw shafts 4, 4.

Furthermore, a screw driver 6 is installed between the front and rear plates 1, 2, by slidably putting it on the top face at both sides of the installation board 16, without inserting the tie bars 13, 13. A pair of ball nut members 7, 7 moving with the screw driver 6 on the ball screw shaft, engaged by threads with the ball screw shaft 4, is installed inside the middle at both the right and left sides of the screw driver 6.

A slider 17 serving also as centering member of the screw driver 6 is installed between the screw driver 6 and the installation board 16 and between the front and back of the screw drive 6 beneath both lower sides. The slider 17 comprises a pair of wedge-shape members overlapping alternately by forming a contact surface respectively as a slant surface, and both of them are linked relatively movably by an adjustment screw 18 on the side.

The ball screw shaft 4 comprises a ball screw portion 41 engaged by threads with the ball nut member 7 of the screw driver 6, a required length of shaft portion 42, though omitted in FIG. 3, born by a bearing member 11 via a ball bearing of the front plate 1 as shown in FIG. 1, and a support shaft portion 43 at the rear end born rotatably by the rear plate 2. An annular stress relaxation groove 12 is disposed in a region between the front plate 1 of the shaft portion 42 and the ball screw portion 41.

Figure 5:
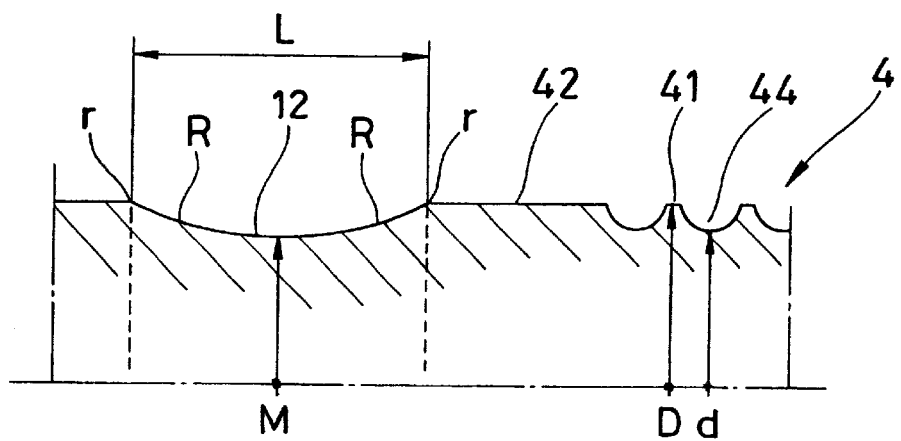
FIG. 5 is a longitudinal partial portion view of the essential parts of the ball screw shaft.

In any of the aforementioned embodiments, the stress relaxation groove 12 of the ball screw shaft 4 is installed by forming the groove shaft diameter (M) smaller than the root diameter (d) of the ball screw groove 44, and the bottom face is flat and is formed to make a globally concave curbed surface, as shown in FIG. 5.

The longitudinal length (L) of the stress relaxation groove 12 is determined affording a room in the length direction of the shaft portion 42 in a range of:

$$L=(D-M)/12 \times 6 \text{ to } 10$$

where D is the outer diameter of the ball screw portion 42 and M is the shaft diameter of the groove.

In addition, as for the dimensions of the curvature (R) of the bottom face on both sides and the curvature (r) of the corners, the radius of curvature is set as large as possible provided that no stress concentration is generated.

The shaft diameter (M) of the groove is defined under the condition that the stress sM of the concerned region is superior to the stress sd of the root diameter and inferior to the allowable stress 9 Kgf/mm$^2$ of a clamp screw portion 31 of the guide bar 3.

In short, it means $$sd < sM < 9 \text{ Kgf/mm}^2$$

The annular stress relaxation groove 12 installed around the shaft of the ball screw shaft 4 prevents a relative misalignment or bending of the axial line of the ball screw shaft 4 and the ball nut member 7 from being generated, resolves an excessive load at the thread engagement region of the ball screw portion 41 with the ball nut member 7, and also by other effects, prevents an abnormal wear or deterioration, break or others of the ball screw shaft 4, maintains a smooth advance and regression operation of the screw driver 6, and extends the service life of the ball screw portion 41 and the ball nut member 7.

Though any of the aforementioned embodiments is provided with a driving means comprising a plurality of ball screw shafts and ball nut members, it should be appreciated that the present invention is not limited to the twin screw type electric injection mechanism, because it can also be applied to those provided with a driving means comprising a single ball screw shaft and ball nut member.

What is claimed is:

1. An electric injection mechanism, comprising:

a screw driver disposed movably between a pair of front and rear support plates on a machine base, a driving means comprising ball screw shaft and a ball nut member disposed over the screw driver and the plate, and an electric motor of the driving means, wherein:

a shaft between a ball screw portion and a bearing portion of said ball screw shaft is partially formed with a diameter smaller than a root diameter of a ball screw groove, forming a stress relaxation groove having a bottom face with a flat concave curbed face at the shaft.

2. An electric injection mechanism, comprising:

a pair of front and rear support plates disposed on machine base by linking by means of a plurality of guide bars, a pair of right and left ball screw shafts disposed rotatably in parallel with the guide bars over the front and rear plates, a screw driver provided right and left inside with a pair of ball nut members meshing with said ball screw shaft, and inserted movably into the guide bars between the front and rear plates, and an electric motor of a driving means comprising said ball screw shaft and ball nut member, wherein:

a shaft between a ball screw portion and a bearing portion said ball screw shaft is partially formed with a diameter smaller than a root diameter of a ball screw groove, forming a stress relaxation groove having a bottom face with a flat concave curbed face at the shaft.

3. An electric injection mechanism, comprising:

a pair of support plates disposed in front and behind an installation member on a machine base, a pair of right and left ball screw shafts juxtaposed rotatably over the front and rear plates, a screw driver provided right and left inside with a pair of ball nut members meshing with said ball screw shafts, and put slidably on the installation member between the front and rear plates, and an electric motor of a driving means comprising said ball screw shaft and ball nut member, wherein:

a shaft between a ball screw portion and a bearing portion of said ball screw shaft is partially formed with a diameter smaller than a root diameter of a ball screw groove, forming a stress relaxation groove having a bottom face with a flat concave curbed face at the shaft.

* * * * *

UNITED STATES PATENT AND TRADEMARK OFFICE
CERTIFICATE OF CORRECTION

PATENT NO. : 6,641,388 B2  Page 1 of 1
DATED : November 4, 2003
INVENTOR(S) : Atsushi Koide et al.

It is certified that error appears in the above-identified patent and that said Letters Patent is hereby corrected as shown below:

Title page,
Item [57], ABSTRACT,
Line 12, "that" should read -- than --;

Column 4,
Line 55, "sM" should read -- σM --;
Line 56, "sd" should read -- σd --;
Line 61, "sd<sM<9 kgf/mm$^2$" should read -- σd<σM<9 kgf/mm$^2$ --; and Column 6,
Line 9, "said ball screw" should read -- of said ball screw --.

Signed and Sealed this

Twenty-eighth Day of December, 2004

JON W. DUDAS
*Director of the United States Patent and Trademark Office*

UNITED STATES PATENT AND TRADEMARK OFFICE
CERTIFICATE OF CORRECTION

PATENT NO. : 6,641,388 B2  
DATED : November 4, 2003  
INVENTOR(S) : Atsushi Koide et al.

Page 1 of 1

It is certified that error appears in the above-identified patent and that said Letters Patent is hereby corrected as shown below:

<u>Title page,</u>  
Item [57], ABSTRACT,  
Line 12, "that" should read -- than --;

<u>Column 4,</u>  
Line 55, "sM" should read -- σM --;  
Line 56, "sd" should read -- σd --;  
Line 61, "sd<sM<9 Kgf/mm$^2$" should read -- σd<σM<9 Kgf/mm$^2$ --; and <u>Column 6,</u>  
Line 9, "said ball screw" should read -- of said ball screw --.

This certificate supersedes Certificate of Correction issued December 28, 2004.

Signed and Sealed this

Third Day of May, 2005

JON W. DUDAS  
*Director of the United States Patent and Trademark Office*